United States Patent
Bell, Jr. et al.

(10) Patent No.: US 7,996,346 B2
(45) Date of Patent: Aug. 9, 2011

(54) METHOD FOR AUTONOMIC WORKLOAD DISTRIBUTION ON A MULTICORE PROCESSOR

(75) Inventors: Robert H. Bell, Jr., Austin, TX (US); Louis Bennie Capps, Jr., Georgetown, TX (US); Thomas Edward Cook, Essex Junction, VT (US); Thomas J. Dewkett, Staatsburg, NY (US); Naresh Nayar, Rochester, MN (US); Ronald Edward Newhart, Essex Junction, VT (US); Bernadette Ann Pierson, South Hero, VT (US); Michael Jay Shapiro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 11/959,520

(22) Filed: Dec. 19, 2007

(65) Prior Publication Data

US 2009/0164399 A1    Jun. 25, 2009

(51) Int. Cl.
G06F 15/18  (2006.01)
G06F 9/46   (2006.01)
G06F 9/48   (2006.01)
G06F 9/50   (2006.01)

(52) U.S. Cl. ................. 706/25; 718/102; 718/107

(58) Field of Classification Search .................. 706/25
See application file for complete search history.

(56) References Cited

FOREIGN PATENT DOCUMENTS

CN    1860446 A    11/2006
CN    101076770 A  11/2007

OTHER PUBLICATIONS

Jones, "Linux and symmetric multiprocessing", IBM, Mar. 14, 2007.*
Bothe, "Increase Performance With Embedded Multi-Core Processors", Information Quarterly, vol. 5, No. 4, 2006; pp. 44-51.*
Office Action for Chinese Patent Application No. 200810181268.4, dated Mar. 23, 2011.

* cited by examiner

*Primary Examiner* — David R Vincent
*Assistant Examiner* — Nathan H Brown, Jr.
(74) *Attorney, Agent, or Firm* — Hamilton & Terrile, LLP; Stephen A. Terrile

(57) ABSTRACT

A multiprocessor system which includes automatic workload distribution. As threads execute in the multiprocessor system, an operating system or hypervisor continuously learns the execution characteristics of the threads and saves the information in thread-specific control blocks. The execution characteristics are used to generate thread performance data. As the thread executes, the operating system continuously uses the performance data to steer the thread to a core that will execute the workload most efficiently.

16 Claims, 2 Drawing Sheets

METHOD FOR AUTONOMIC WORKLOAD DISTRIBUTION ON A MULTICORE PROCESSOR

BACKGROUND OF THE INVENTION

1. Field of the Invention

The present invention relates to a method for autonomic workload distribution on a multicore processor and more specifically to automate workload distribution on a multicore processor.

2. Description of the Related Art

In multi-core computer systems, different system resources (such as CPUs, memory, I/O bandwidth, disk storage, etc.) are each used to operate on multiple instruction threads. Challenges associated with efficiently operating these multi-core computer systems only increase as the number and complexity of cores in a multiprocessor computer grows.

One issue relating to the use of multi-core integrated circuits is that it often is difficult to write software to take advantage of the multiple cores. To take advantage of the multi-core processors, tasks often need to be divided into threads, and the threads often need to be distributed onto available cores. An issue relating to distributing threads is how to efficiently steer the threads. In known systems, workload is sent to cores based on availability and affinity. In other systems, software is written so that particular tasks run on a specific type core. As the number and type of cores increase, there will be an opportunity to distribute workload in a more intelligent way.

SUMMARY OF THE INVENTION

In accordance with the present invention, a multi-core system which includes automatic workload distribution is set forth. More specifically, as threads execute in the multi-core system, an operating system/hypervisor continuously learns the execution characteristics of the threads and saves the information in thread-specific control blocks. The execution characteristics are used to generate thread performance data. As the thread executes, the operating system/hypervisor continuously uses the performance data to steer the thread to a core that will execute the workload most efficiently.

More specifically, in one embodiment, the invention relates to a method for automatic workload distribution within a multiprocessor system. The method includes measuring performance of an application while executing on processors of the multiprocessor system; storing data relating to performance of the application on the processors of the multiprocessor system; and, assigning executing of an application to a processor having characteristics corresponding to processing consumption attributes of the application.

In another embodiment, the invention relates to an apparatus for automatic workload distribution within a multi-core processor. The apparatus includes means for measuring performance of an application while executing on processors of the multiprocessor system; means for storing data relating to performance of the application on the processors of the multiprocessor system; and, means for assigning executing of an application to a processor having characteristics corresponding to processing consumption attributes of the application.

In another embodiment, the invention relates to a multi-core processor system comprising a plurality of processor cores and a memory. The memory stores an automatic workload distribution system. The automatic workload distribution system includes instructions executable by the multi-core processor for measuring performance of an application while executing on processors of the multiprocessor system; storing data relating to performance of the application on the processors of the multiprocessor system; and, assigning executing of an application to a processor having characteristics corresponding to processing consumption attributes of the application.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
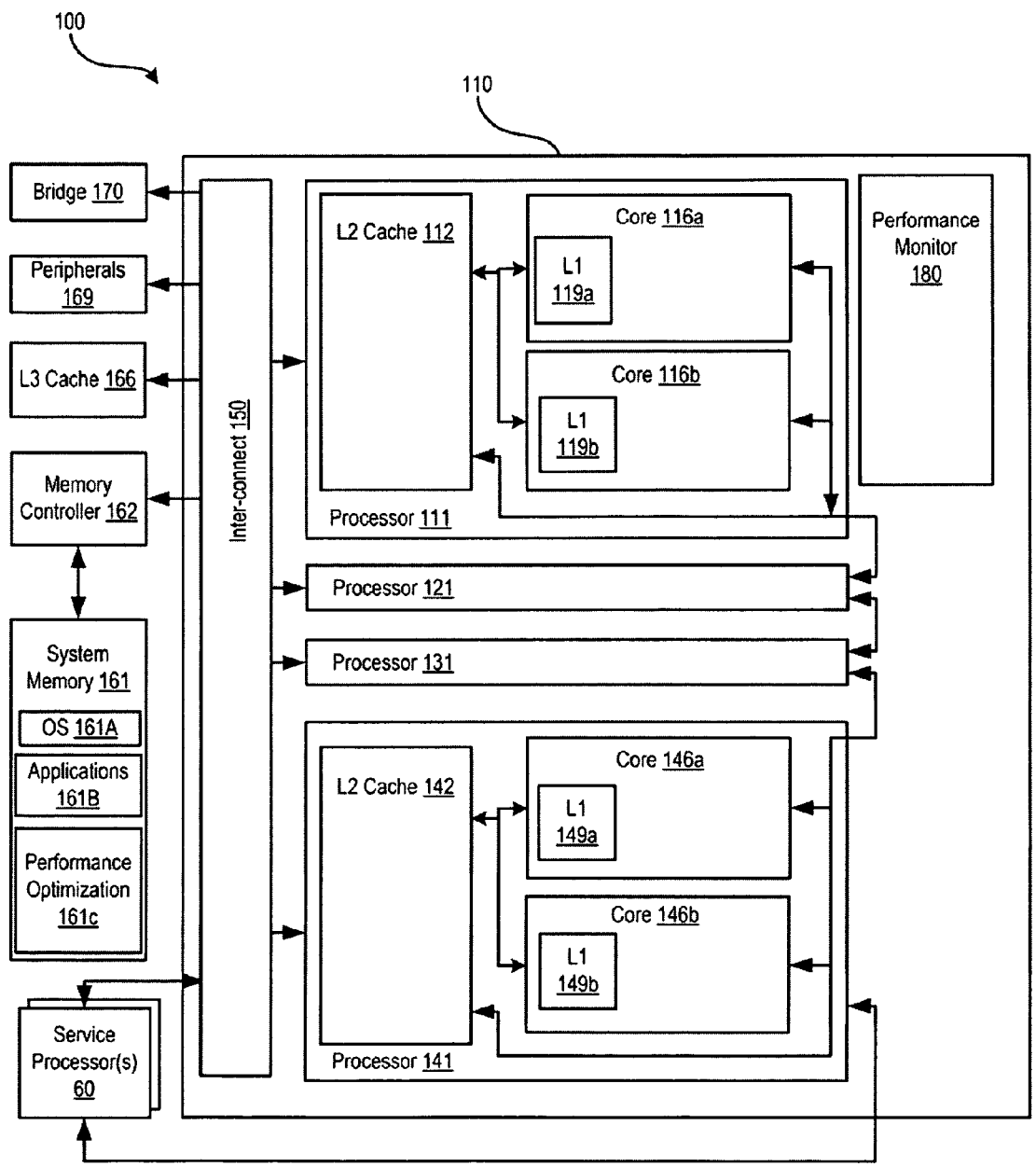
FIG. 1 shows a multi-processor computer architecture in which selected embodiments of the present invention may be implemented.

Referring now to FIG. 1, there is illustrated a high-level block diagram of a multiprocessor (MP) data processing system 100 that provides improved execution of single thread programs in accordance with selected embodiments of the present invention. The data processing system 100 has one or more processing units arranged in one or more processor groups, and as depicted, includes four processing units 111, 121, 131, 141 in processor group 110. In a symmetric multiprocessor (SMP) embodiment, all of the processing units 111, 121, 131, 141 are generally identical, that is, they all use a common set or subset of instructions and protocols to operate, and generally have the same architecture. As shown with processing unit 111, each processing unit may include one or more processor cores 116a, 116b which carry out program instructions in order to operate the computer. An exemplary processing unit would be the POWER5™ processor marketed by International Business Machines Corp. which comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

As further depicted in FIG. 1, each processor core 116a, 116b includes an on-board (L1) cache memory 119a, 119b (typically, separate instruction and data caches) that is constructed from high speed memory devices. Caches are commonly used to temporarily store values that might be repeatedly accessed by a processor, in order to speed up processing by avoiding the longer step of loading the values from system memory 161. A processing unit can include another cache such as a second level (L2) cache 112 which, along with a cache memory controller (not shown), supports both of the L1 caches 119a, 119b that are respectively part of cores 116a and 116b. Additional cache levels may be provided, such as an L3 cache 166 which is accessible via fabric bus 150. Each cache level, from highest (L1) to lowest (L3) can successively store more information, but at a longer access penalty. For example, the on-board L1 caches (e.g., 119a) in the processor cores (e.g., 116a) might have a storage capacity of 128 kilobytes of memory, L2 cache 112 might have a storage capacity of 4 megabytes, and L3 cache 166 might have a storage capacity of 132 megabytes. To facilitate repair/replacement of defective processing unit components, each processing unit 111, 121, 131, 141 may be constructed in the form of a replaceable circuit board, pluggable module, or similar field replaceable unit (FRU), which can be easily swapped, installed in, or swapped out of system 100 in a modular fashion.

The processing units communicate with other components of system 100 via a system interconnect or fabric bus 150. Fabric bus 150 is connected to one or more service processors 160, a system memory device 161, a memory controller 162, a shared or L3 system cache 166, and/or various peripheral devices 169. A processor bridge 170 can optionally be used to interconnect additional processor groups. Though not shown, it will be understood that the data processing system 100 may also include firmware which stores the system's basic input/output logic, and seeks out and loads an operating system from one of the peripherals whenever the computer system is first turned on (booted).

As depicted in FIG. 1, the data processing system 100 includes multiple system resources (e.g., cache memories, memory controllers, interconnects, I/O controllers, etc) which are shared among multiple threads.

The system memory device 161 (random access memory or RAM) stores program instructions and operand data used by the processing units, in a volatile (temporary) state, including the operating system 161A and application programs 161B. Automatic workload distribution module 161C may be stored in the system memory in any desired form, such as an operating system module, Hypervisor component, etc, and is used to optimize the execution of a single threaded program across multiple cores of the processor units. Although illustrated as a facility within system memory, those skilled in the art will appreciate that automatic workload distribution module 161C may alternatively be implemented within another component of data processing system 100 or an automatic workload distribution unit may exist as a stand alone unit (located either in the processor or off of the processor). The automatic workload distribution module 161C is implemented as executable instructions, code and/or control logic including programmable registers which is operative to check performance monitor information for codes running on the system 100, to assign priority values to the code using predetermined policies, and to tag each instruction with its assigned priority value so that the priority value is distributed across the system 100 with the instruction, as described more fully below.

The system 100 also includes a performance monitor 180. The performance monitor 180 may provide the performance information used by the automatic workload distribution module 161C where performing an automatic workload distribution function. More specifically, as threads execute in the multi-core system, an operating system/hypervisor continuously learns the execution characteristics of the threads and saves the information in thread-specific control blocks. The execution characteristics are used to generate thread performance data. As the thread executes, the operating system/hypervisor continuously uses the performance data to steer the thread to a core that will execute the workload most efficiently.

Figure 2:
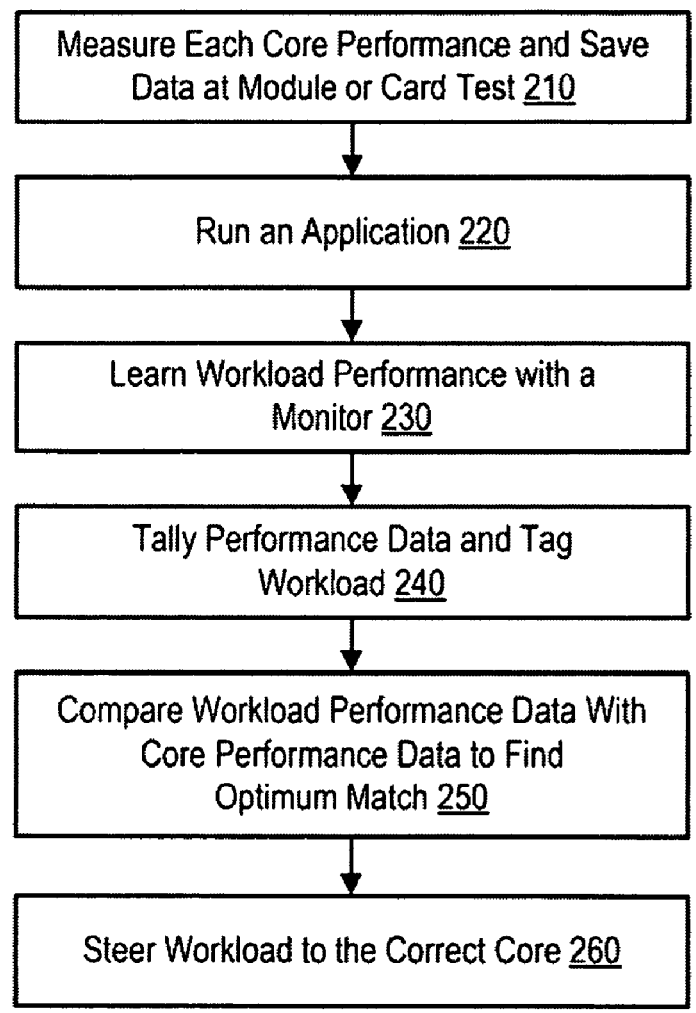
FIG. 2 shows a flow chart of the operation of an automatic workload distribution system on a multi-core processor.

Referring to FIG. 2, a flow chart of the operation of automatic workload distribution on a multi-core processor is shown. The automatic workload distribution function learns how workloads perform on within the multi-core system and steer the workloads to an optimal core. More specifically, the automatic workload distribution process starts testing the performance of the multi-core processor. The multi-core processor may include homogeneous or heterogeneous cores. With a processor that includes homogeneous cores, each processor will perform differently due to semiconductor process variations. For example, at the same voltage level one core may run faster than another instance of the core. Different cores may be able to be executing at different frequencies. The differences in performance are measured at module or card test (e.g., via the performance monitor 180) at step 210. The measurement is made by executing a targeted application set at step 220. The performance data is stored on a chip, module or card ROM. For processors which include heterogeneous cores, measurements can be made of floating point or vector performance as examples. Performance assignments can also be made from knowledge of the design of the processor.

The first time an application is executed in the system, a performance monitor on the core measures the characteristics of the system usage. The monitor analyzes for example, single or double floating point operation, memory usage (L1, L2 or main memory accesses), instructions that use single or multiple cycles, and other items. The performance monitor learns the resource load that the application puts on the system at step 230. The application or subroutine or thread is tagged and the performance data is stored at step 240. The performance monitor data is extracted from the performance monitor 180. The hardware performance data is stored within a core data structure of the thread for use by the operating system/hypervisor/cluster scheduler. (The hardware performance data may also be used to characterize performance of the cores of the processor and characterization information may be stored on the processor.) The scheduler compares the hardware utilization statistics stored in the control data structure of the thread with characteristics for the processors on the system at step 250. The operating system or hypervisor assigns the thread to the appropriate core that best matches the hardware capabilities with the workload of the software measured processing consumption attributes at step 260.

The data can also be used by the scheduler to intelligently combine workloads on a processor or core. For example, the automatic workload distribution 170 may determine that it is more efficient to execute a thread that frequently accesses memory with a thread that accesses data out of the cache on the same core or processor. The data can also be used to match cache latency performance to caches with various latencies and sizes.

The combination of processors with different processing characteristics all being part of a single system, cluster, or hypervisor execution complex, low level non-intrusive processor or core performance monitoring capabilities, and a scheduling algorithms that makes dispatching decisions based on measured unit utilization characteristics to route work to the appropriate processor or core provides an advantageous automatic workload distribution system. Additionally, because this process is continuous and performance utilization data is gathered during every time slice, a thread or workload can autonomously move from processor to processor in the complex over time if the thread or workload contains workload changes.

Those skilled in the art will appreciate that data processing system 100 can include many additional or fewer components, such as I/O adapters, interconnect bridges, non-volatile storage, ports for connection to networks or attached devices, etc. Because such components are not necessary for an understanding of the present invention, they are not illustrated in FIG. 1 or discussed further herein. However, it should also be understood that the enhancements provided by the present invention are applicable to multi-threaded data processing systems of any architecture and are in no way limited to the generalized MP architecture illustrated in FIG. 1.

Consequently, the invention is intended to be limited only by the spirit and scope of the appended claims, giving full cognizance to equivalents in all respects.

What is claimed is:

1. A method for automatic workload distribution within a multiprocessor system comprising
   measuring performance of an application while executing on processors of the multiprocessor system;
   storing data relating to performance of the application on the processors of the multiprocessor system; and,
   assigning executing of an application to a processor having characteristics corresponding to processing consumption attributes of the application; and wherein
   the storing is within a control data structure of a corresponding application.

2. The method of claim 1, further comprising:
   comparing hardware utilization statistics stored in the control data structure of the application with characteristics for processors on the system.

3. The method of claim 1, wherein:
   the multiprocessor system comprises a performance monitor; and,
   the measuring is performed by the performance monitor of the multiprocessor system.

4. The method of claim 1, wherein:
   at least one processor of the processors of the multiprocessor system comprises a plurality of cores; and,
   the measuring comprises measuring performance of an application while executing on the plurality of cores of the at least one processor; and further comprising
   characterizing performance of the plurality of cores based upon the measuring; and,
   storing characterization information relating to performance of the plurality of cores of the at least one processor.

5. The method of claim 2, wherein:
   the resource load comprises determining at least one of single or double floating point operation, memory usage, and, instructions that use single or multiple cycles.

6. A method for automatic workload distribution within a multiprocessor system comprising
   measuring performance of an application while executing on processors of the multiprocessor system;
   storing data relating to performance of the application on the processors of the multiprocessor system;
   assigning executing of an application to a processor having characteristics corresponding to processing consumption attributes of the application;
   learning a resource load that the application places on the multiprocessor system; and,
   considering the resource load when assigning executing of the application based upon the resource load.

7. An apparatus for automatic workload distribution within a multi-core processor comprising
   means for measuring performance of an application while executing on processors of the multiprocessor system;
   means for storing data relating to performance of the application on the processors of the multiprocessor system; and,
   means for assigning executing of an application to a processor having characteristics corresponding to processing consumption attributes of the application; and wherein
   the storing is within a control data structure of a corresponding application.

8. The apparatus of claim 7, further comprising:
   means for comparing hardware utilization statistics stored in the control data structure of the application with characteristics for processors on the system.

9. The apparatus of claim 7, wherein:
   the multiprocessor system comprises a performance monitor; and,
   the measuring is performed by the performance monitor of the multiprocessor system.

10. An apparatus for automatic workload distribution within a multi-core processor comprising
    means for measuring performance of an application while executing on processors of the multiprocessor system;
    means for storing data relating to performance of the application on the processors of the multiprocessor system;
    means for assigning executing of an application to a processor having characteristics corresponding to processing consumption attributes of the application;
    means for learning a resource load that the application places on the multiprocessor system; and,
    means for considering the resource load when assigning executing of the application based upon the resource load.

11. The apparatus of claim 10, wherein:
    the resource load comprises determining at least one of single or double floating point operation, memory usage, and, instructions that use single or multiple cycles.

12. A multi-core processor system comprising
    a plurality of processor cores;
    a memory, the memory storing an automatic workload distribution system, the automatic workload distribution system comprising instructions executable by the multi-core processor for
      measuring performance of an application while executing on processors of the multiprocessor system;
      storing data relating to performance of the application on the processors of the multiprocessor system; and,
      assigning executing of an application to a processor having characteristics corresponding to processing consumption attributes of the application; and wherein,
    the storing is within a control data structure of a corresponding application.

13. The multi-core processor system of claim 12, wherein the automatic workload distribution system further comprises instructions for:
    comparing hardware utilization statistics stored in the control data structure of the application with characteristics for processors on the system.

14. The multi-core processor system of claim 12, further comprising:
    a performance monitor; and wherein
    the instructions for measuring cause the performance monitor to measure performance of the application.

15. A multi-core processor system comprising:
    a plurality of processor cores;
    a memory, the memory storing an automatic workload distribution system, the automatic workload distribution system comprising instructions executable by the multi-core processor for
      measuring performance of an application while executing on processors of the multiprocessor system;
      storing data relating to performance of the application on the processors of the multiprocessor system;
      assigning executing of an application to a processor having characteristics corresponding to processing consumption attributes of the application learning a resource load that the application places on the multiprocessor system; and,
considering the resource load when assigning executing of the application based upon the resource load.

16. The multi-core processor system of claim 15, wherein the automatic workload distribution system further comprises instructions for:

the resource load comprises determining at least one of single or double floating point operation, memory usage, and, instructions that use single or multiple cycles.

* * * * *